(12) United States Patent
Szeliski et al.

(10) Patent No.: US 7,587,099 B2
(45) Date of Patent: Sep. 8, 2009

(54) REGION-BASED IMAGE DENOISING

(75) Inventors: Richard S. Szeliski, Redmond, WA (US); Sing Bing Kang, Redmond, WA (US); Ce Liu, Arlington, MA (US); Charles L. Zitnick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 11/340,969

(22) Filed: Jan. 27, 2006

(65) Prior Publication Data

US 2007/0177817 A1    Aug. 2, 2007

(51) Int. Cl.
*G06K 9/40* (2006.01)
*G06K 9/00* (2006.01)

(52) U.S. Cl. .................. 382/275; 382/162; 348/241

(58) Field of Classification Search ............ 382/275; 348/241
See application file for complete search history.

(56) References Cited

U.S. PATENT DOCUMENTS

| | | |
|---|---|---|
| 6,819,804 B2 | 11/2004 | Tenze |
| 6,888,564 B2 | 5/2005 | Caviedes |
| 6,959,117 B2* | 10/2005 | Ratner et al. ............ 382/255 |
| 2007/0036467 A1* | 2/2007 | Coleman et al. ......... 382/294 |

FOREIGN PATENT DOCUMENTS

JP         2003-274181 A      9/2003

OTHER PUBLICATIONS

Schultz et al. "A Window-Based Bayesian Estimator for Noise Removal." Proceedings of the 37th Midwest Symposium on Circuits and Systems, vol. 2, Aug. 3-5, 1994, pp. 860-863.*

Portilla, J., Strela, V., Wainwright, M.J., Simoncelli, E.P.: Image denoising using scale mixtures of Gaussians in the wavelet domain. IEEE Trans. on Image Processing 12 (2003) 1338-1351.

Awate, S.P., Whitaker, R.T.; Higher-order image statistics for unsupervised, information-theoretic, adaptive, image filtering. In: CVPR. (2005).

Buades, A., Coll, B., Morel, J.M.: A non-logical algorithm for image denoising. In: CVPR. (2005).

Roth, S., Black, M.J.: Fields of experts: A framework for learning image priors. In: CVPR. (2005).

Zhu, S.C., Mumford, D.: Prior learning and Gibbs reaction-diffusion. IEEE TPAMI 19 (1997) 1236-1250.

Petschnigg, G., et al.: Digital photography with flash and no-flash image pairs. ACM Transactions on Graphics 23 (2004) 664-672.

(Continued)

*Primary Examiner*—Jon Chang
(74) *Attorney, Agent, or Firm*—Lyon & Harr, LLP; Mark A. Watson (57) ABSTRACT

An "Image Denoiser" provides a probabilistic process for denoising color images by segmenting an input image into regions, estimating statistics within each region, and then estimating a clean (or denoised) image using a probabilistic model of image formation. In one embodiment, estimated blur between each region is used to reduce artificial sharpening of region boundaries resulting from denoising the input image. In further embodiments, the estimated blur is used for additional purposes, including sharpening edges between one or more regions, and selectively blurring or sharpening one or more specific regions of the image (i.e., "selective focus") while maintaining the original blurring between the various regions.

20 Claims, 7 Drawing Sheets
(2 of 7 Drawing Sheet(s) Filed in Color)

OTHER PUBLICATIONS

Perona, P., Malik, J.: Scale-space and edge detection using anisotropic diffusion. IEEE TPAMI 12 (1990) 629-639.

Tomasi, C., Manduchi, R.: Bilateral filtering for gray and color images. In: ICCV. (1998) 839-846.

Mallat, S.G.: A theory for multiresolution signal decomposition: The wavelet representation. IEEE TPAMI 11 (1989) 674-693.

Field, D.: Relations between the statistics of natural images and the response properties of cortical cells. J Opt Soc Am A 4 (1987) 2379-2394.

Lee, A.B., Mumford, D., Huang, J.: Occlusion models for natural images: A statistical study of a scale-invariant dead leaves model. IJCV 41 (2001) 35-59.

Simoncelli, E.P., Adelson, E.H.: Noise removal via Bayesian wavelet coring. In: Int'l Conf on Image Proc. vol. I. (1996) 379-382 14 ECCV2006 Submission #851.

Simoncelli, E.P.: Statistical models for images: Compression, restoration and synthesis. In: 31st Asilomar Conf. on Signals, Systems and Computers. (1997) 673-678.

Black, M.J., Sapiro, G., Marimont, D.H., Heeger, D.: Robust anisotropic diffusion. IEEE Trans. on Image Processing 7 (1998) 421-432.

Geman, S., Geman, D.: Stochastic relaxation, gibbs distributions, and the Bayesian restoration of images. IEEE TPAMI 6 (1984) 721-741.

Zhu, S.C., Wu, Y., Mumford, D.: Filters, random fields and maximum entropy (FRAME): Towards a unified theory for texture modeling. IJCV 27 (1998) 107-126.

Durand, F., Dorsey, J.: Fast bilateral filtering for the display of high-dynamic-range images. In: SIGGRAPH. (2002) 257-266.

Baker, S., Szeliski, R., Anandan, P.: A layered approach to stereo reconstruction. In: CVPR. (1998) 434-441.

Blake, A., Rother, C., Brown, M., Perez, P., Torr, P.: Interactive image segmentation using an adaptive GMMRF model. In: ECCV. vol. I. (2004) 428-441.

Leclerc, Y.G.: Constructing simple stable descriptions for image partitioning. IJCV 3 (1989) 73-102.

Marroquin, J., Mitter, S., Poggio, T.: Probabilistic solution of ill-posed problems in computational vision. J. of the American Statistical Assoc. 82 (1987) 76-89.

Bertalmio, M., Sapiro, G., Caselles, V., Ballester, C.: Image inpainting. In: SIGGRAPH. (2000) 417-424.

Blinn, J.F.: Jim Blinn's corner: Compositing, part 1: Theory. IEEE Computer Graphics and Applications 14 (1994) 83-87.

Comaniciu, D., Meer, P.: Mean shift: A robust approach toward feature space analysis. IEEE TPAMI 24 (2002) 603-619.

Felzenszwalb, P.F., Huttenlocher, D.P.: Efficient graph-based image segmentation. IJCV 59 (2004) 167-181.

Zitnick, C.L., Jojic, N., Kang, S.: Consistent segmentation for optical flow estimation. In: ICCV. (2005.

Gabor, L.: Theory of communication. J. of the IEEE 93 (1946) 429-459.

Martin, D., et al.: A database of human segmented natural images and its application to evaluating segmentation algorithims and measuring ecological statistics. In: ICCV. (2001) 416-423.

\* cited by examiner

REGION-BASED IMAGE DENOISING

BACKGROUND

1. Technical Field

The invention is related to image denoising, and in particular, to a technique for estimating denoised color images as a probabilistic function of estimated regions and estimated blurs at edges between the estimated regions of noisy images.

2. Related Art

Image denoising is a common problem in image processing. Early approaches to image denoising often focused on optimal filtering (such as Wiener filtering) for Gaussian image and noise processes and heuristic algorithms such as median filtering. Many modern denoising schemes use statistical models that are defined either directly on pixel neighborhoods or on filtered versions of the noisy image. In either case, conventional denoising schemes generally attempt to preserve meaningful edges in the image while suppressing unwanted noise in the image.

Unfortunately, conventional denoising schemes typically fail to adequately capture the piecewise smooth nature of objects as perceived by human viewers. It is well known that the perception of image noise is subject to masking, i.e., noise is more perceptible in smoothly shaded regions than in highly textured (high variance) regions. Anecdotally, people find color noise resulting from large gains in digital cameras set to high-ISO ratings quite objectionable, since this adds artificial high-frequency coloration to what people know should be uniformly colored objects. Furthermore, the artificial increase in sharpness that tends to occur with techniques such as anisotropic diffusion and bilateral filtering can destroy the natural softness at intensity edges and lead to a "cartoonish" (or banded) appearance in denoised images.

For example, a number of conventional denoising schemes use wavelets in an attempt to denoise images. However, when a natural image is decomposed into multiscale oriented subbands, highly kurtotic marginal distributions are often observed (as opposed to the marginal distribution of a Gaussian process, which typically has low kurtosis). To enforce the marginal distribution to have high kurtosis, wavelet based techniques typically suppress low-amplitude wavelet coefficient values while retaining high-amplitude values, a technique frequently referred to as "coring."

One such coring technique operates by finding the joint distribution of wavelets to be correlated. Joint wavelet coefficients are simultaneously inferred in a small neighborhood across a range of subbands of different orientations and scales. The typical joint distribution for denoising is a Gaussian scale model (GSM) for generating a denoised copy of the input image.

Unfortunately, wavelet-based denoising schemes often introduce certain "ringing artifacts" into the denoised image. In other words, such schemes tend to introduce additional edges or structures in the denoised image.

Another type of conventional denoising scheme involves the use of simple Gaussian filtering to generate a denoised image. Such Gaussian filtering is generally equivalent to solving an isotropic heat diffusion equation represented by a second order linear partial differential equation (PDE). Unfortunately, edges in such denoised images tend to become blurred. Related conventional denoising schemes use "anisotropic diffusion" to keep edges sharp in the denoised image. Unfortunately, denoising schemes based on anisotropic diffusion tend to over-blur the image or artificially sharpen region boundaries (edges).

Related denoising schemes operate by learning a complete prior model over the entire image from marginal distributions. Such schemes sometimes use Bayesian inference for denoising or restoration of the input image. The resulting PDE is qualitatively similar to anisotropic diffusion but is based on learned prior models. Unfortunately, learning such priors (i.e., Gibbs distributions), using conventional techniques such as Markov chain Monte Carlo (MCMC) techniques tend to be computationally inefficient. Furthermore, these methods share some of the drawbacks of anisotropic diffusion, i.e., occasional over-blurring (over-smoothing) and edge/region boundary sharpening.

An alternative adaptation of Gaussian filtering uses a technique referred to as bilateral filtering to preserve edges by accounting for both space and range distances. Bilateral filtering techniques have been widely adopted for denoising images, particularly for color images in recovering high dynamic-range (HDR) images. Unfortunately, such schemes are unable to effectively deal with speckle noise in images. Further, as with Gaussian filtering and anisotropic filtering, bilateral filtering based denoising schemes also sometimes over-smooth and over-sharpen edges in the denoised image.

Other denoising techniques take advantage of cases where there are multiple images of a static scene to provide image denoising. Such schemes generally operate by estimating pixel means from multiple input images to remove the noise in an output image where both the scene and camera are static. Unfortunately, such "non-local" denoising schemes are not generally practical for use in denoising a single image. However, in the case where individual images have a sufficient number of repeating patterns, related techniques operate to approximate temporal pixel means as a function of spatial pixel means. In particular, as long as there are enough similar patterns in a single image, patterns similar to a "query patch" can be identified and used to determine the mean or other statistics to estimate true pixel values for denoising the image. These non-local methods work well for texture-like images containing many repeated patterns, but fail with images where there are not many repeating patterns. Furthermore, such methods tend to be computationally expensive as compared to other conventional denoising schemes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An "Image Denoiser," as described herein, provides a technique for denoising individual color images as a probabilistic function of estimated regions of noisy images.

In general, the Image Denoiser begins operation by analyzing an input image to identify boundaries between approximately piecewise smooth regions of the input image. In other words, the Image Denoiser acts to decompose or segment the input image into a plurality of piecewise smooth regions.

Next, the Image Denoiser estimates a low-dimensional statistical model for each piecewise smooth region. In one embodiment, estimation of the statistical models for each piecewise smooth region is generally accomplished by assuming a linearly varying mean color for each region and estimating a correlated color covariance matrix of any remaining residuals for each region to construct the statistical model for each region.

The Image Denoiser then optionally estimates a local blur at edges between each region. The purpose of estimating the amount of local blur is to address the problem of edge sharpening between regions. In one embodiment, estimation of the local blur is accomplished by sampling strips of a predetermined width along the boundaries between regions and analyzing the color differentials within these strips along either side of the boundary to estimate local blurring. In another embodiment, estimation of the local blur is accomplished by using a search technique that minimizes a computed error with respect to a series of hypothetical blurs along the boundary between each region. The hypothetical blur having the lowest computed error is selected as the best blur for each region boundary.

A denoised copy of the input image is then estimated as a probabilistic function of the statistical model computed for each region by generally compositing the statistical models for each region to create a denoised copy of original image.

Further, because simple compositing of these statistical models may result in artificial sharpening of the region boundaries, in one embodiment, the estimated blurs are applied to blur the boundaries between each of the composited regions. The application of these estimated blurs to the composited image serves to produce a denoised image wherein the blur between the various regions of the denoised image approximates the blur of the original noisy image.

In view of the above summary, it is clear that the Image Denoiser described herein provides a unique system and method for denoising color images. In addition to the just described benefits, other advantages of the Image Denoiser will become apparent from the detailed description which follows hereinafter when taken in conjunction with the accompanying drawing figures.

DESCRIPTION OF THE DRAWINGS

The file of this patent contains at least one drawing executed in color. Copies of this patent with color drawing(s) will be provided by the Patent and Trademark Office upon request and payment of the necessary fee. The specific features, aspects, and advantages of the present invention will become better understood with regard to the following description, appended claims, and accompanying drawings where:

FIG. 5(a) through 5(l) illustrates a series of images showing various stages and methods of image denoising operations.

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environments

Figure 1:
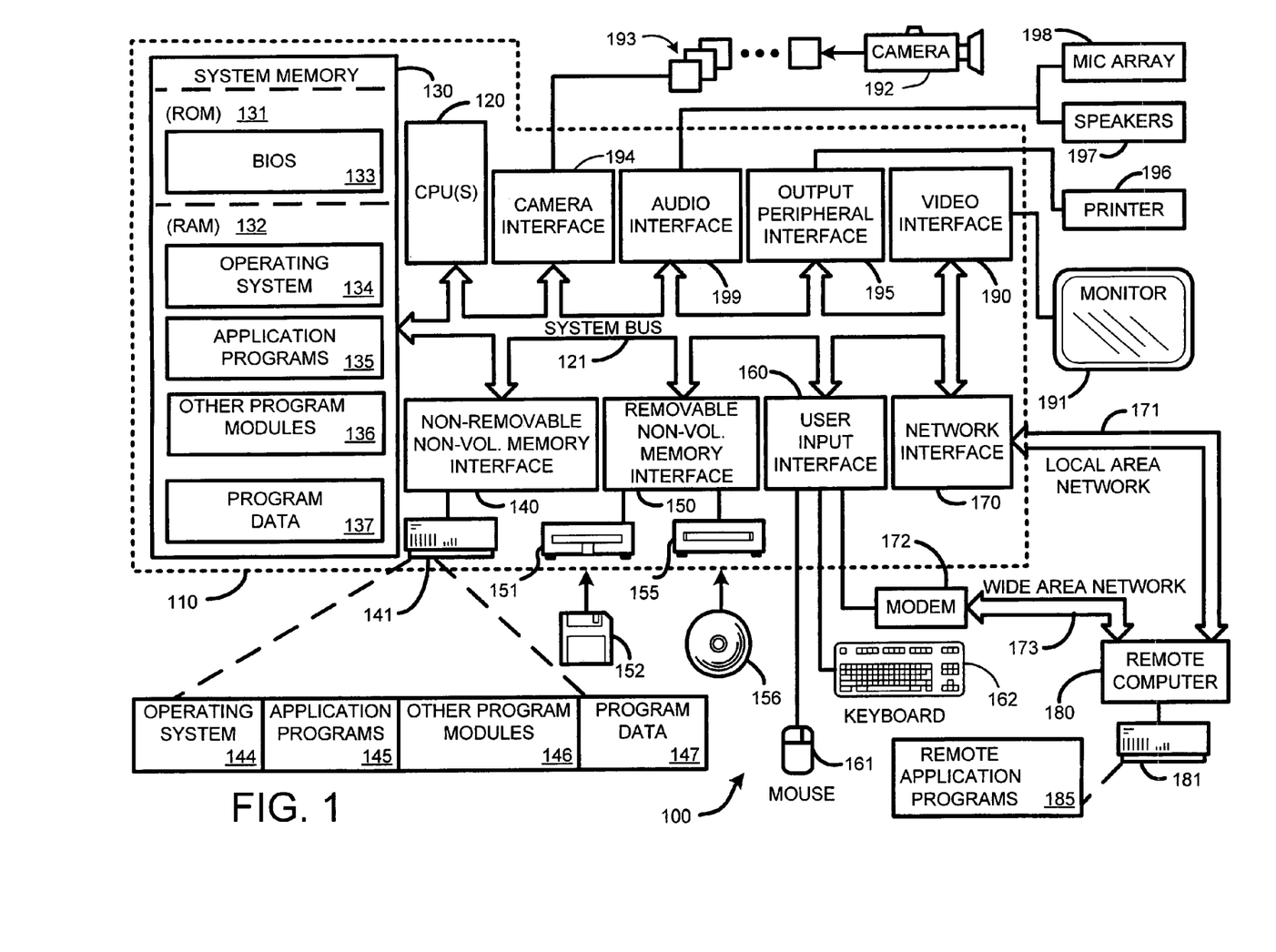
FIG. 1 is a general system diagram depicting a general-purpose computing device constituting an exemplary system for implementing an Image Denoiser, as described herein.
Figure 2:
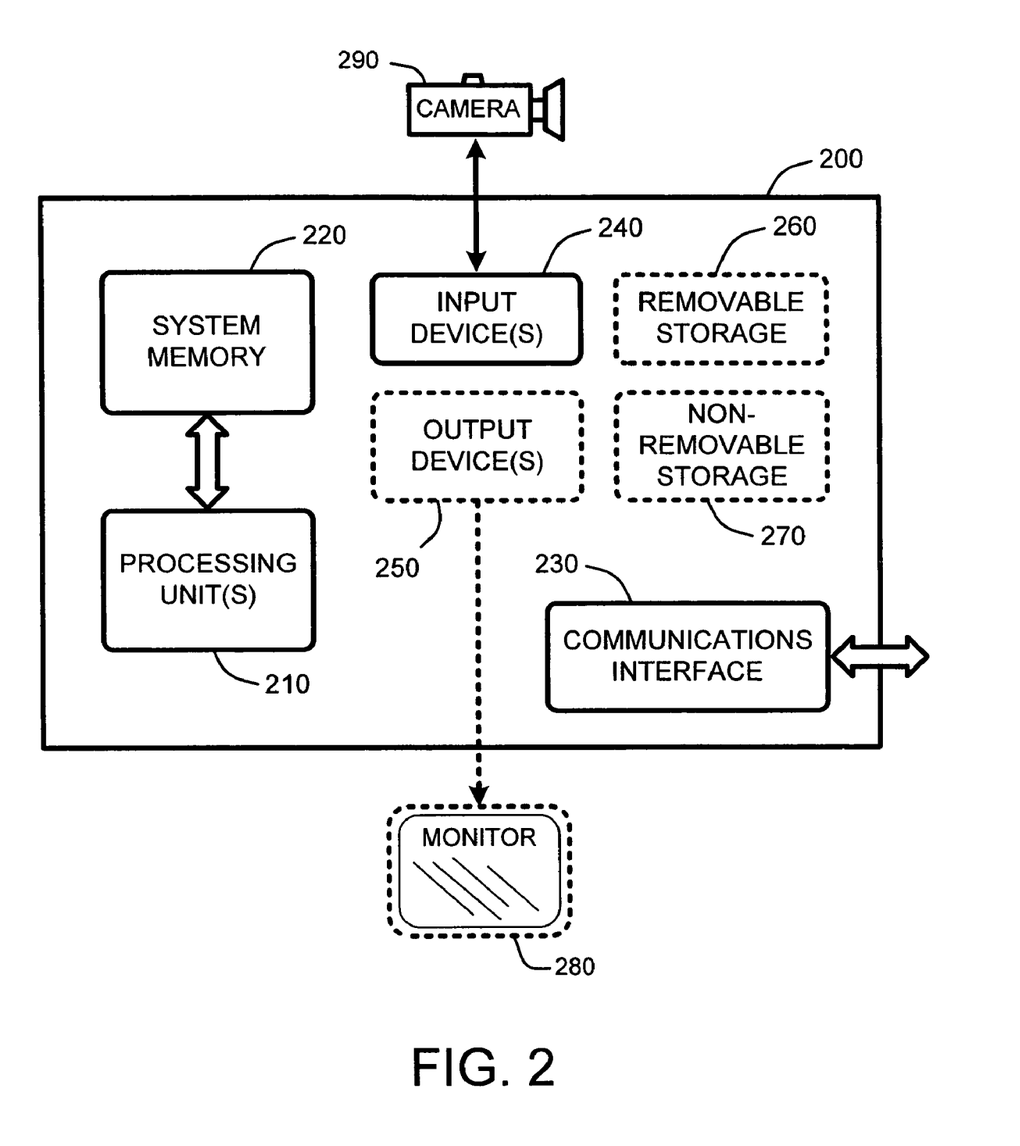
FIG. 2 is a general system diagram depicting a general computing device having simplified computing and I/O capabilities for use with a digital camera or other image input source for implementing the Image Denoiser.
Figure 3:
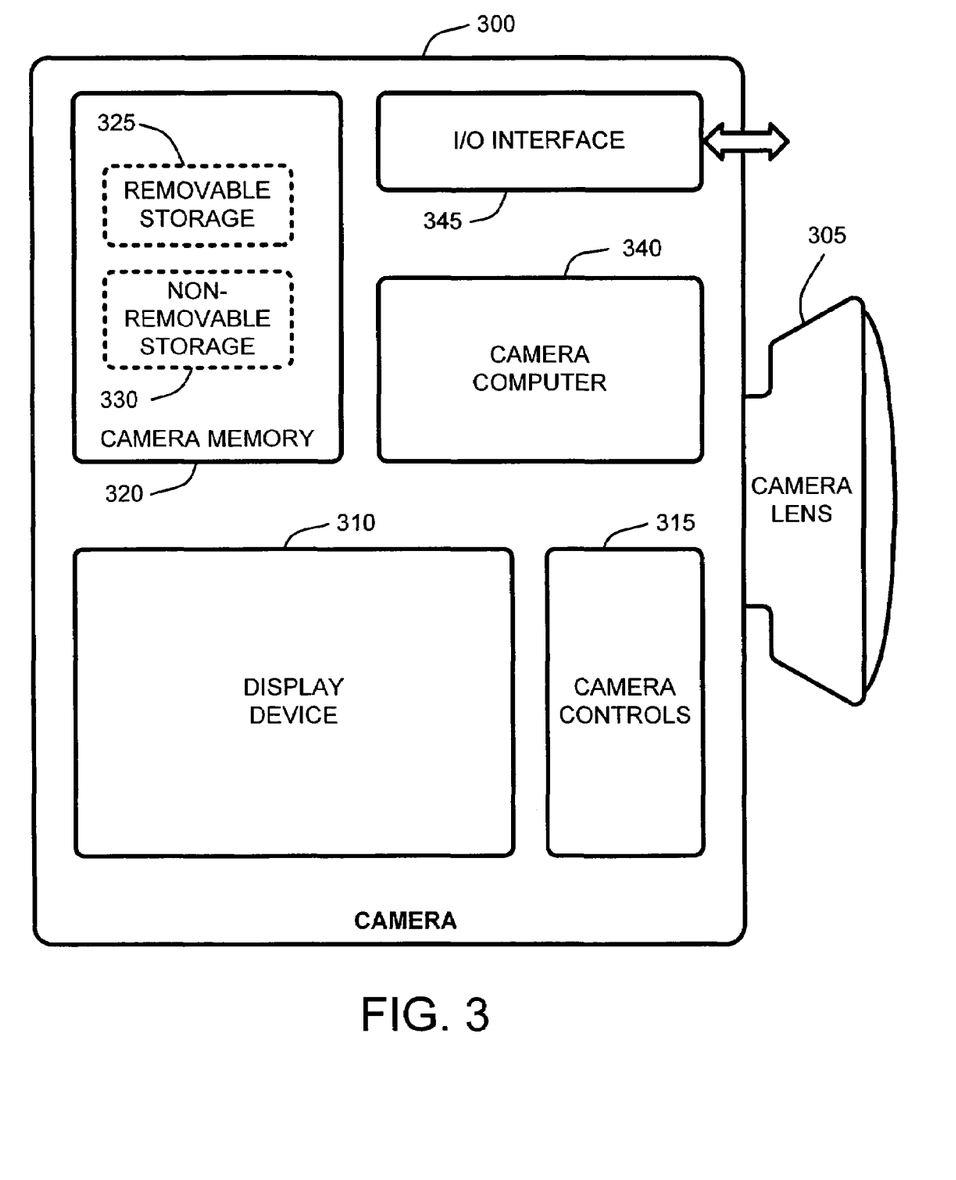
FIG. 3 is a general system diagram depicting a digital camera having integrated computing capabilities for implementing the Image Denoiser.

FIG. 1, FIG. 2, and FIG. 3 illustrate various examples of suitable computing environments on which various embodiments and elements of an "Image Denoiser," as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional wired or wireless interfaces, including, for example, USB, IEEE 1394, Bluetooth™, IEEE 802.11, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device coupled to a digital camera. Such computing devices can typically be found in devices having at least some minimum computational capability in combination with a communications interface. Examples of well known simplified computing systems, environments, and/or configurations that may be suitable for use with the invention include, but are not limited to, hand-held, laptop or mobile computers, communications devices such as cell phones and PDA's, etc.

It should be noted that any boxes that are represented by broken or dashed lines in FIG. 2 represent alternate embodiments of the simplified computing device, as described herein, and that any or all of these alternate embodiments, as described below, may be used in combination with other alternate embodiments that are described throughout this document.

At a minimum, to enable a computing device to implement the "Image Denoiser" (as described in further detail below), the computing device 200 must have some minimum computational capability and a wired or wireless interface 240 for connecting a digital camera 290 or other image input source.

In particular, as illustrated by FIG. 2, the computational capability of the computing device 200 is generally illustrated by processing unit(s) 210 (roughly analogous to processing units 120 described above with respect to FIG. 1), and system memory 220. Note that in contrast to the processing unit(s) 120 of the general computing device of FIG. 1, the processing unit(s) 210 illustrated in FIG. 2 may be specialized (and inexpensive) microprocessors, such as a DSP, a VLIW processor, or other micro-controller rather than the general-purpose processor unit of a PC-type computer or the like, as described above.

In addition, the simplified computing device 200 of FIG. 2 may also include other components, such as, for example connections for one or more input devices 240 (analogous to the input devices described with respect to FIG. 1). The simplified computing device of FIG. 2 may also include other optional components, such as, for example one or more output devices 250 (analogous to the output devices described with respect to FIG. 1), such as an external display device 280. Finally, the simplified computing device of FIG. 2 may also include removable and/or non-removable storage, 260 and 270, respectively (analogous to the storage devices described with respect to FIG. 1).

Finally, with respect to FIG. 3, this figure is a general system diagram depicting a digital camera 300 having integrated computing 340 and I/O capabilities 345, for implementing an Image Denoiser, as described herein. Such cameras 300 may also include an integral display device 310, such as an LCD screen.

In general, as is well known to those skilled in the art, conventional digital cameras include components such as those described above (e.g., I/O, computing, and display), in addition to camera memory 320 that is either removable 325 or non-removable 330. Such cameras also include a lens 305 and a set of one or more controls 315. Further, as with the simplified computing device described with respect to FIG. 2, the computing capability 340 of the digital camera can be implemented using low cost specialized processors, such as a DSP, a VLIW processor, or other micro-controller rather than the general-purpose processor unit of a PC-type computer or the like, as described above with respect to FIG. 1. As described in further detail below, these components are used in combination to enable the functionality of the Image Denoiser in a standalone digital camera. This embodiment allows images to be denoised within the camera itself either as soon as they are captured, or in response to a user command to denoise one or more of the captured images.

The exemplary operating environments having now been discussed, the remaining part of this description will be devoted to a discussion of the program modules and processes embodying the "Image Denoiser."

2.0 Introduction:

Typical images are often composed of a plurality of generally piecewise smooth regions, as perceived by human viewers. Further, the color variability and the amount of texture within each of the visible regions that make up a typical image are likely to have very different statistics than other regions in the image, assuming that various regions of the image represent different materials. The boundaries between these regions generally form visible edges, which can be sharp or fuzzy. The amount of blur also tends to be spatially anisotropic.

An "Image Denoiser," as described herein leverages the concept of piecewise smooth regions by applying a generative Bayesian model of image formation to probabilistically explain the piecewise smooth nature of the various regions of the image in combination with estimated blur between the various regions. This probabilistic explanation of the input image is used in generating a denoised copy of the input image.

2.1 System Overview:

As noted above, the Image Denoiser described herein provides a system and method for denoising color images. In general terms, the Image Denoiser generally operates by segmenting an input image into approximately piecewise smooth regions, estimating statistics within each region, and then estimating a clean (or denoised) image using a probabilistic model of image formation.

In one embodiment, estimated blur between each region is used to reduce artificial sharpening of region boundaries resulting from denoising the input image. In further embodiments, the estimated blur is used for additional purposes, including sharpening edges between one or more regions, and selectively blurring or sharpening one or more specific regions of the image (i.e., "selective focus") while maintaining the original blurring between the various regions.

2.2 System Architectural Overview

Figure 4:
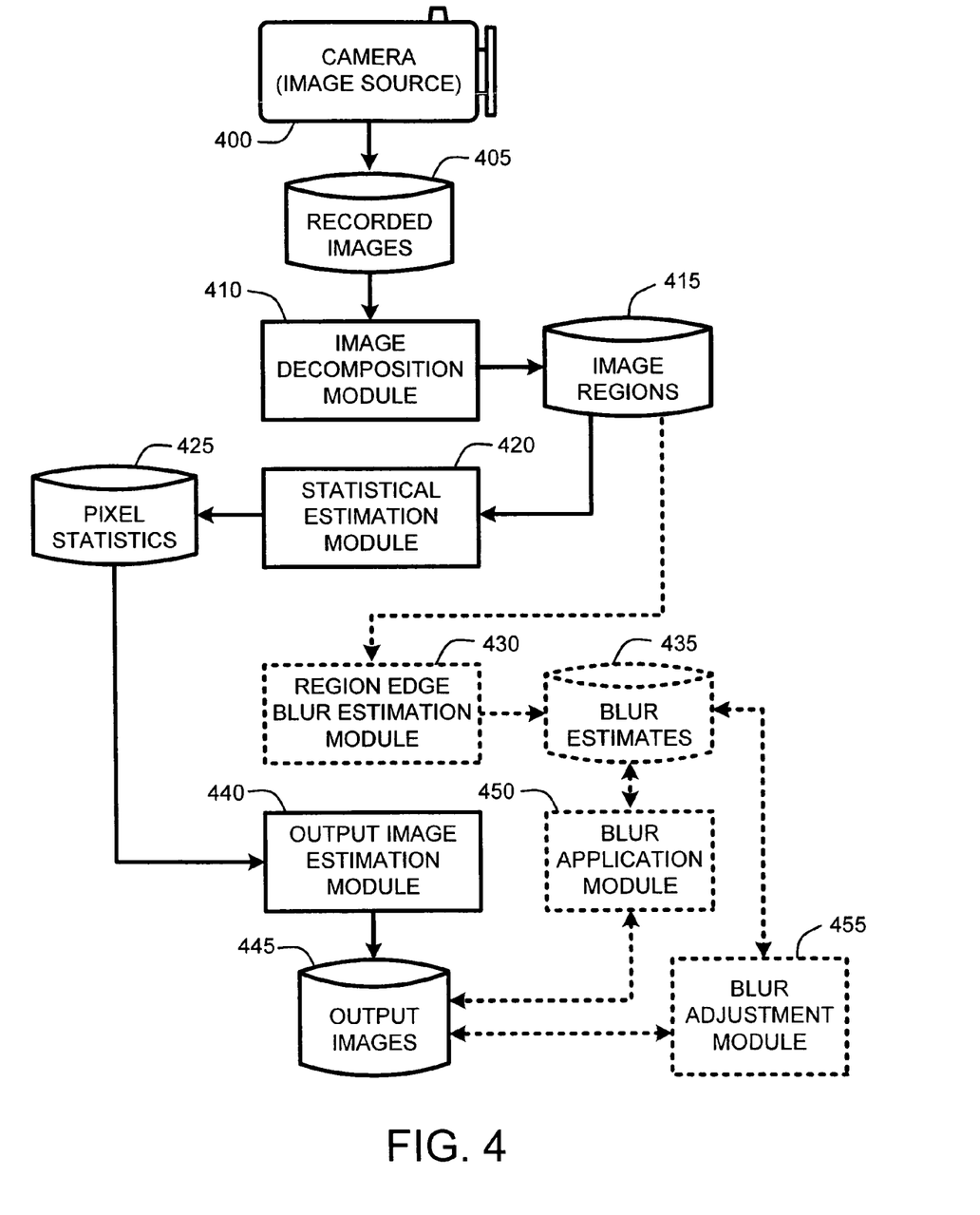
FIG. 4 illustrates an exemplary architectural system diagram showing exemplary program modules for implementing the Image Denoiser.

The processes summarized above are illustrated by the general system diagram of FIG. 4. In particular, the system diagram of FIG. 4 illustrates the interrelationships between program modules for implementing the Image Denoiser, as described herein. It should be noted that any boxes and interconnections between boxes that are represented by broken or dashed lines in FIG. 4 represent alternate embodiments of the Image Denoiser described herein, and that any or all of these alternate embodiments, as described below, may be used in combination with other alternate embodiments that are described throughout this document.

In general, as illustrated by FIG. 4, the Image Denoiser generally begins operation by providing a recorded image 405, which may be captured via a digital camera 400, or the like, to an image decomposition module 410. The image decomposition module 410 operates to decompose the input image 405 into a plurality of approximately piecewise smooth regions 415.

A statistical estimation module 420 then evaluates the image regions 415 and estimates pixel statistics 425 for each region by fitting a pixel mean value function to the noisy pixels of the input image. A covariance matrix is then estimated for each region from the residual pixel values (i.e., the noisy pixels remaining after fitting the mean value function to each region of the input image). Together, these regional pixel statistics describe the image pixels in each region. Statistical modeling of each of the image regions 415 is discussed in further detail in Section 3.4.2.

In one embodiment, a region edge blur estimation module 430 then evaluates the boundaries of each of the input regions 415 to estimate the original blur 435 between the regions of the original input image 405. Blur estimation is discussed in further detail in Section 3.5.

An output image estimation module 440 then evaluates the estimated statistics defining each of region 415 and constructs a denoised output image 445 by maximizing an a posteriori likelihood of clean residual image that is then added to the mean estimates of the pixels statistics for each region to produce the denoised output image. Note that as described in Sections 3.4.3 and 3.4.4, low-dimensional probabilistic models of different orders may be used in estimating the output image from the regional pixel statistics 425.

In another embodiment, the optionally computed blur estimates 435 are then used by a blur application module 450 to blur the edges of the output image such that any edge blurring in the output image corresponds to the edge blurring estimated for the original image regions 415. Applying these blur estimates to the output image serves to create a denoised image 445 wherein the blur of any edges approximates that of the original image.

In a related embodiment, a blur adjustment module 455 is used to adjust the blur of either the region edges or the regions themselves. Blur adjustment is accomplished either automatically, or via a user interface which allows a user to manually specify one or more edges or regions along with a desired amount of blurring or sharpening to be applied to the selected edges or regions. In various embodiments, this blur adjustment enables a variety of applications such as motion blur reduction, simulation of selective focus, and super-resolution or sharpening or particular regions or edges of the output image. Note that blur adjustment and the related embodiments are discussed in further detail in Section 3.5.

3.0 Operation Overview

The above-described program modules are employed for implementing the Image Denoiser described herein. As summarized above, this Image Denoiser provides a system and method for denoising color images. The following sections provide a detailed discussion of the operation of the Image Denoiser, and of exemplary methods for implementing the program modules described in Section 2.

3.1 Operational Details of the Image Denoiser

The following paragraphs detail specific operational embodiments of the Image Denoiser described herein. In particular, the following paragraphs describe general assumptions regarding input images; a generative model of image formation that enables subsequent probabilistic denoising of images; probabilistic image denoising as a function of region-based statistical modeling of the input image; and the use of blur estimates and blur adjustments for adjusting the appearance of the denoised output image.

It should be noted that while the following discussion generally assumes that a noisy input image is provided to an external computing device for denoising operations. However, the processes described herein also apply to embodiments wherein the computing capability for denoising images is integral to the image capture device itself, such as described above in Section 1.0 with respect to FIG. 3 wherein a digital camera or the like includes an integral Image Denoiser for denoising color images.

Figure 5:
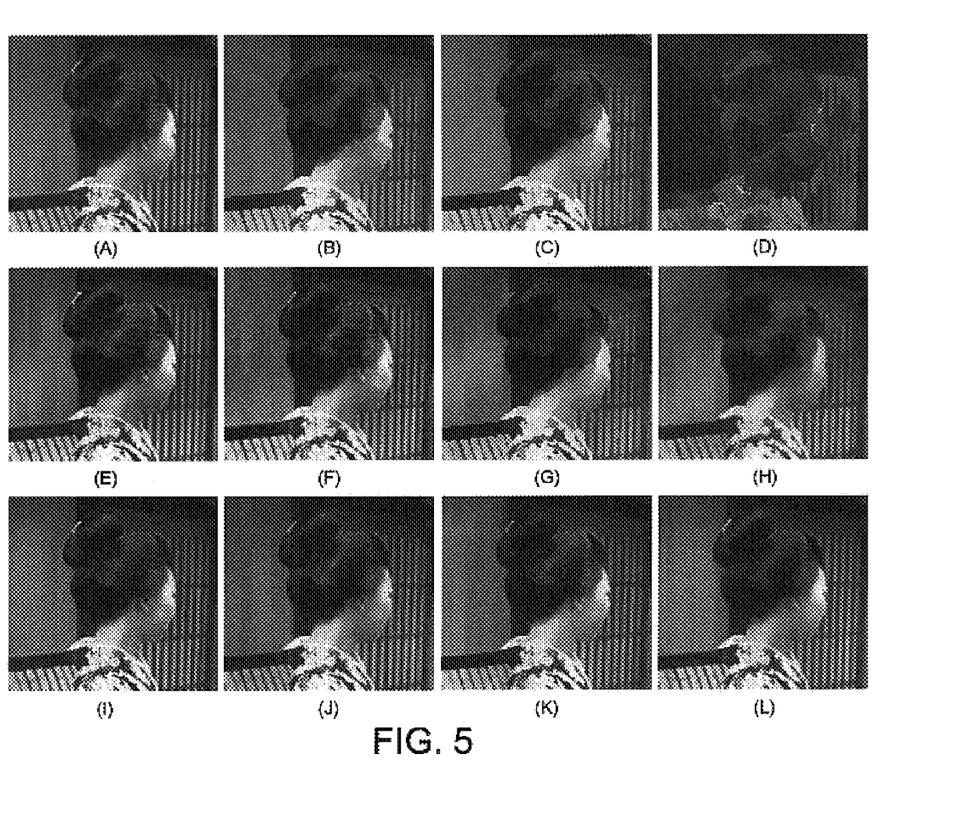

As described in further detail below, FIG. 5(a) through (l) illustrates various examples of image segmentation, noise, and restoration. For example, FIG. 5(a) illustrates detail from an original input image. FIG. 5(b) illustrates estimated constant region pixel means. FIG. 5(c) illustrates estimated affine region pixel means. FIG. 5(d) illustrates estimated region covariances (the scaled first principal direction is shown). FIG. 5(e) illustrates the original input image projected onto the covariances of FIG. 5(d). FIG. 5(f) illustrates a noisy version of original input image of FIG. 5(a). FIG. 5(g) illustrates estimated affine region pixel means of the noisy image of FIG. 5(f). FIG. 5(h) illustrates blurred affine region pixel means. FIG. 5(i) illustrates the effects of using a $0^{th}$-order probabilistic model for denoising the image of FIG. 5(f). FIG. 5(j) illustrates the effects of using a first-order probabilistic model for denoising the image of FIG. 5(f). Finally, FIG. 5(k) and 5(l) illustrate the result of conventional denoising techniques (bilateral filtering and wavelet coring, respectively) for denoising the noisy image of FIG. 5(f).

3.2 Input Images

As noted above, the Image Denoiser processes arbitrary color images to probabilistically denoise those images. These images may be pre-recorded on a computer readable medium, or provided via any conventional analog or digital camera, via a scanner, or via a video stream feed that is capable of being interfaced with an external computing device, and by extension to the Image Denoiser.

3.3 Derivation of a Generative Model of Image Formation

There are several reasons why a generative Bayesian model of image formation model, as described herein, operates effectively for use in image denoising applications. For example, it is well known that the perception of noise is subject to masking, i.e., noise is more perceptible in smoothly shaded regions than in highly textured (high variance) regions as illustrated by FIG. 5(f). Anecdotally, people find color noise resulting from large gains in digital cameras set to high-ISO ratings quite objectionable, since this adds artificial high-frequency coloration to what are known to be uniformly colored objects as illustrated in FIG. 1(f). Furthermore, the artificial increase in sharpness that occurs with conventional techniques such as anisotropic diffusion and bilateral filtering can destroy the natural softness at intensity edges and lead to a "cartoonish" (or banded) appearance.

The color image denoising techniques described herein are generally based on a generative Bayesian model of image formation, which consists of several steps:
1. Region generation;
2. Per-region colored Markov Random Field (MRF) sampling;
3. Region blurring;
4. Region compositing; and
5. Noise addition.

Each of the aforementioned steps is described in more detail in the following paragraphs, which provide various embodiments for constructing a generative model of image formation for generic images. Then, denoising of actual images using the concepts described with respect to the probabilistic generative model of image formation is discussed.

3.3.1 Region-Based Image Sampling

In general, it is assumed that the image is generated by compositing, in back-to-front order, a set of overlapping, irregularly shaped regions, $\Re_l$, where:

$$\Re_l = \{M_l(x,y), (\mu_l, \nabla\mu_l, C_l, S_l), b_l\} \quad \text{Eq. 1}$$

with each region having an associated support mask $M_l(x,y)$, color statistics $\mu_l, \nabla\mu_l, C_l, S_l$, and optional blur width $b_l$. (Note that the meaning of these terms is explained below.)

In many images, neighboring regions may have correlated statistics, depending upon the content of the image. For example, regions that differ only in overall shading (say a crease edge or strong shadow) have similar color covariances. Further, neighboring regions often have similar blur widths. Such regional correlations may be considered in defining the generative model of image formation. However, for purposes of explanation in the following paragraphs, any correlation between the statistics of neighboring regions will be ignored. Note that good image denoising results are still achieved without evaluating such regional correlations.

3.3.2 Colored Texture Sampling

The color image formation process within each region is a correlated Gaussian Markov Random Field (GMRF) model. Each region has a linearly varying (affine) mean color, where:

$$\mu(x,y) = \mu_l + \nabla\mu_l \cdot [x,y] \quad \text{Eq. 2}$$

which is used to model smooth shading variations within a region. FIG. 5(b) to 5(c) show the recovered per-region mean colors (constant and linearly varying) for the sample input image of FIG. 5(a). Note that linearly varying means generally do a better job of modeling the underlying smooth shading variations than do constant means.

The deviation from the mean is a first-order MRF, $z(x,y)$, whose energy (negative log-likelihood) can be written as:

$$E_p(z) = \sum_{x,y} z(x,y)^T C_l^{-1} z(x,y) + h(x,y)^T S_l^{-1} h(x,y) + v(x,y)^T S_l^{-1} v(x,y) \quad \text{Eq. 3}$$

where $C_l$ is the color covariance matrix and $S_l$ controls the MRF smoothness. The spatial derivatives $h(x,y)$ and $v(x,y)$ are evaluated using first-order forward finite differences:

$$h(x,y) = z(x+1,y) - z(x,y)$$

$$v(x,y) = z(x,y+1) - z(x,y) \quad \text{Eq. 4}$$

Note that these types of first-order Gaussian MRFs (quadratic energies based on first-order differences) are well known to those skilled in the art, and have been used for applications such as optic flow, surface interpolation, and inpainting.

The use of a correlated color covariance matrix is an important feature of the generative model of image formation. In particular, it has been observed that once the local means have been removed, the residuals are usually very well approximated by a one-dimensional variation along the principal color covariance direction. FIG. 5(d) shows the principal covariance direction (color) for each region, scaled by its standard deviation. FIG. 5(e) shows what happens when the original color image residual is projected onto this direction and then added back to the mean. The results are mostly indistinguishable from the original image. This demonstrates that modeling the oriented nature of the local covariance structure is extremely powerful. Further, using different color statistics for each region is also important to the success of the generative model.

The first-order smoothness matrix $S_l$ controls the frequency characteristics of the texture within each region. If it is assumed that the spatial correlations vary along the same directions as the color covariance, i.e., $S_l = s_l C_l$, or that the smoothness matrix is a scaled identity matrix, $S_l = s_m I$, the GMRF described above reduces to shaped Gaussian noise along each of the three color covariance matrix directions.

It is straightforward to show using Fourier analysis that the frequency spectrum along each of these directions has a magnitude of $[\lambda_j^{-1} + 4\eta_j^{-1}(\sin^2(\omega_x/2) + \sin^2(\omega_y/2))]$, where $\lambda_j$ is the eigenvalue (variance) along a principal direction of the color covariance matrix $C_l$, and $\eta_j = s_j \lambda_j$ or $s_j$, depending on whether the $S_l$ matrix is shaped like $C_l$ or is white. Thus, the image statistics are not only correlated in color, but they are also inhomogeneous, since they have different spectra for each region.

The final per-region image texture $R_l(x,y)$ is then constructed by adding the spatially varying mean $\mu(x,y)$ and the colored residual $z(x,y)$ as illustrated by Equation 5:

$$R_l(x,y) = \mu(x,y) + z(x,y) \quad \text{Eq. 5}$$

While the choice of first-order MRF is somewhat arbitrary, it results in an extremely efficient estimation (inference) algorithm, as discussed in Section 3.4. Of course, it is well known to those skilled in the art that image statistics are not in fact Gaussian. In particular, spatial image derivatives tend to exhibit highly kurtotic (long-tailed) distributions. In one embodiment, in defining the generative model of image formation, it is assumed that most of these non-Gaussian effects occur at region boundaries. This assumption allows the construction of a simplified generative model for use in image restoration or denoising algorithms. This simplified model is described below for purposes of explanation. However, it should be appreciated by those skilled in the art that the use of more sophisticated statistical models within each region can potentially lead to better denoising results. Such models would assume that non-Gaussian effects occur throughout the region, rather than merely at region boundaries. Consequently, the Image Denoiser described herein is not intended to be limited to the use of the simplified model described below, which assumes that non-Gaussian effects occur at region boundaries.

3.3.3 Blur Regions and Extents

Once the colored texture image for a given region has been generated, it is then multiplied by the region support mask $M_l(x,y)$ and then optionally blurred with a Gaussian whose width (standard deviation) is $b_l$:

$$R_l^b(x,y) = G(x,y;b_l) * R_l(x,y)$$

$$M_l^b(x,y) = G(x,y;b_l) * M_l(x,y) \quad \text{Eq. 6}$$

where $G(x,y;b_l)$ is the Gaussian convolution kernel of width $b_l$. This optional blurring is meant to model effects such as depth of field and imperfections in the optics. The resulting blurred color (RGB) and soft alpha (A) images $R_l^b(x,y)$ and $M_l^b(x,y)$ are then passed to the aforementioned compositing stage.

Note that the blurring changes the frequency characteristics (and hence the perceived smoothness) of each textured region. However, for purposes of explanation, the following discussion does not describe explicit modeling of this phenomenon. Instead, in the following discussion, it is assumed that the blurring only affects the soft mask image. The estimated smoothness and covariance for each region are therefore not accurate estimates of the true region statistics. However, unless it is specifically desired to sharpen blurred regions, this assumption does not affect the final denoised results, and results in a simpler (first order MRF) estimation algorithm. However, it should be appreciated by those skilled in the art, that in the case where it is desired to sharpen particular regions, the aforementioned effects of blurring on the frequency characteristics of each textured region may be modeled.

In one embodiment, the generative model for image formation assumes that the extents of the region support masks, $M_l(x,y)$ can be directly inferred from a noisy image using a standard image segmentation algorithm. While this may seem like an optimistic assumption, it has been observed to result in good performance, especially since some of the processing stages described below will compensate for incorrect image segmentations (e.g., accidental splitting of regions).

3.3.4 Compositing

In constructing the generative model of image formation, individual masked regions are composited together using a traditional over compositing operator, resulting in the final clean image $I(x,y)$. The (partial) composite image can be defined recursively as $$I_l(x,y) = R_l^b(x,y) + [1-M_l(x,y)]I_{l-1}(x,y) \quad \text{Eq. 7}$$

with $I_0(x,y) = R_0^b(x,y)$ and $I(x,y) = I_{L-1}(x,y)$. Note that since the regions $R_l^b(x,y)$ are already pre-multiplied by the masks $M_l(x,y)$, these do not appear in front of the $R_l^b(x,y)$ terms in the Equation 7.

3.3.5 Synthesizing the Noisy Image

The final step in generating the sampled image is to add noise to the composite image. Any desired noise model may be used here, such as uniform noise, correlated noise, intensity-dependent noise, etc. For example, in a tested embodiment, a uniform Gaussian noise was to the composite image to obtain the noisy observed input image:

$$\hat{I}(x,y) = I(x,y) + n(x,y), n \sim N(0,\Sigma_n) \quad \text{Eq. 8}$$

where $\Sigma_n$ is the measurement noise covariance, which in one embodiment is assumed to be uncorrelated across color channels, $\Sigma_n = \sigma_n I$. The negative log-likelihood of an observed image $\hat{I}$ given an original clean image $I$ can be written as a simple quadratic, $$E_m(I) = \sum_{x,y} [\hat{I}(x,y) - I(x,y)]^T \Sigma_n^{-1} [\hat{I}(x,y) - I(x,y)] \quad \text{Eq. 9}$$

3.4 Bayesian Image Denoising

Given the generative model of image formation described above for the probabilistic generation of images, it is possible to denoise existing images as a probabilistic function of the generative model as described in the following paragraphs. In general, the Image Denoiser operates to denoise the pixel values within given regions by first segmenting the image into regions, estimating the statistics within each region, and then estimating the clean image using a low-dimensional probabilistic model derived from the aforementioned generative model. Consequently, it should be clear that in denoising images, the Image Denoiser performs a series of steps that are analogous to the steps described above in Section 3.3 with respect to construction of the generative model. In general, these steps include the following:

1. Segment the image into a series of regions, as described in Section 3.4.1.
2. Within each region, estimate the statistics of each region as described in Section 3.4.2.
3. Use the per-region statistics to estimate the clean image within each region with respect to a low dimensional model. Sections 3.4.3 and 3.4.4 describe $0^{th}$-and first-order models, respectively. However, it should be noted that higher order models may also be used, at the cost of increased computational overhead.
4. Optionally estimate a blur width for each boundary and use this information to blur the mean estimates before performing a global optimization (Section 3.5).

3.4.1 Image Segmentation

Pixel colors are used to segment or decompose the image into regions. While attempting to group similarly colored pixels together, it is also desired to control the size of the regions so that accurate statistics can be computed within them. Any of a number of conventional segmentation techniques may be used for this purpose, including, for example, mean shift or graph-based image segmentation methods.

In a tested embodiment of the Image Denoiser, a conventional K-means clustering method is used for grouping pixels into regions. Each segment is represented by a mean color and spatial extent. In a tested embodiment, the spatial extent is computed so that the shape of the segment is biased towards convex shapes and that all segments have similar size.

It should be appreciated by those skilled in the art that the Image Denoiser described herein is not intended to be limited to the use of the aforementioned K-means clustering method for image segmentation. In particular, any conventional segmentation technique that achieves a reliable detail and boundary detection, such as by combining both color and edge cues, may be used for this initial image segmentation.

3.4.2 Color Statistics Estimation

Once the image has been segmented or decomposed, an affinely varying mean color is estimated within each region along with an estimate of a covariance matrix of the remaining residuals.

The mean image estimation is straightforward. Within each region the mean value function of Equation (2), $\mu(x,y) = \mu_l + \nabla\mu_l \cdot [x,y]$, is fit to the noisy pixels $\hat{I}(x,y)$.

The color covariance matrix $C_l$ is then estimated from the outer product of the residual pixel values, $\hat{z}(x,y) = \hat{I}(x,y) - \mu(x,y)$. However, since this matrix is estimated from the noisy residuals, $\hat{z}(x,y)$, it actually the sum of the true covariance $C_l$ and the image noise covariance $\Sigma_n$. The region color covariance is therefore estimated as:

$$C_l = \langle \hat{z}(x,y)\hat{z}(x,y)^T \rangle - \Sigma_n \quad \text{Eq. 10}$$

Because of the stochastic nature of these estimates, it is possible that the estimated $C_l$ is sometimes not positive definite. To address this particular case, negative and very small eigenvalues are simply set to a value such as 0.0001.

A similar approach can be used in principle to estimate the per-region smoothness matrix $S_l$, where:

$$S_l = \langle h(x,y)h(x,y)^T + v(x,y)v(x,y)^T \rangle \quad \text{Eq. 11}$$

However, in practice, this estimation problem has been observed to be far worse conditioned. Therefore, in a tested embodiment of the Image Denoiser, $S_I$ is simply set to a single constant value across all regions, with the value being experimentally chosen to give reasonable performance on a large number of test images.

3.4.3 $0^{th}$-Order Model

In one embodiment, a $0^{th}$-order model is used to denoise the image. In general, once the region statistics have been estimated as described above, the residual image $\hat{z}(x,y)$ is denoised by maximizing the a posteriori likelihood of the clean residual $z(x,y)$, which is then added to mean estimates $\mu(x,y)$ to produce the final clean image.

Specifically, maximizing the a posteriori likelihood is equivalent to minimizing the sum of the prior energy, Equation (3) and the measurement energy, Equation (9), which can be re-written in terms of the region residual as:

$$E_m(z) = \sum_{x,y} [\hat{z}(x, y) - z(x, y)]^T \Sigma_n^{-1} [\hat{z}(x, y) - z(x, y)] \quad \text{Eq. 12}$$

Note that this assumes that the estimate of the mean image is the true mean, which is only an approximation.

If only use the $0^{th}$-order term of the MRF is used, this has a particularly simple form, $$E_m(z) = \sum_{x,y} [\hat{z}(x, y) - z(x, y)]^T \Sigma_n^{-1} [\hat{z}(x, y) - z(x, y)] + z(x, y)^T C_l^{-1} z(x, y) \quad \text{Eq. 13}$$

which has a simple closed form solution for each residual estimate:

$$z(x, y) = [\Sigma_n^{-1} + C_l^{-1}]^{-1} \Sigma_n^{-1} \hat{z}(x, y) \quad \text{Eq. 14}$$

For a scaled identity $\Sigma_n$, it is easy to show that the attenuation along each principal direction in the color covariance matrix is $\lambda_i/(\lambda_i+\sigma_n)$, where $\lambda_i$ is the variance in the i-th direction. Qualitatively, as this variance tends towards zero (either because the non-dominant direction has low variance, or the region is untextured), the cleaned up residual is progressively more attenuated.

An example of denoising using the $0^{th}$-order model is shown in FIG. 5(i). It can be observed in FIG. 5(i) that the color noise has been significantly reduced whereas the image details are still preserved. The denoised image is not perfectly smooth, however, since the $0^{th}$-order model simply attenuated the noise.

3.4.4 First Order Model

In a related embodiment, a first-order model is used to denoise the image. In particular, in order to apply the first-order model within a region, the full first-order model illustrated in Equation (3) is used in combination with the measurement model of Equation (12). The resulting energy is then minimized using conjugate gradient descent. Note that since this process begins reasonably close to the ideal solution, global inference is a simple local relaxation process and is reasonably fast (no large propagation of errors).

In practice, rather than separately solving for a smoothed residual inside each region, a global optimization process is evaluated where all of the region residuals are solved for simultaneously and the smoothness (spatial derivatives) are applied to the final image and not the residuals. This helps remove visible discontinuities due to mismatches between the affine mean models at the seams.

However, in one embodiment, this approach is further refined with respect to the smoothness near edges (region boundaries and internal edges). Intuitively, the weight (smoothness) for each pixel should be inversely proportional to the boundary intensity, since a larger weight implies more smoothing. Therefore, in a tested embodiment, the heuristic described below is used for estimating the smoothness matrix.

In particular, orientationally elongated Gabor sine and cosine filters are used to capture the boundary energy of the underlying noise-free image. The boundary energy is the sum over all the orientations and sine/cosine phases. A nonlinear function is then used to map the energy to the local value of the weight matrix, $y=(1-\tan h \alpha x)^\beta$. In a tested embodiment, values of $\alpha=0.6$, and $\beta=12$ were chosen for experimental purposes. However, any desired values of $\alpha$ and $\beta$ may be chosen here.

Examples of denoising results using the first-order model are displayed in FIG. 5(j). Compared to the denoising results of the $0^{th}$-order model (FIG. 5(i)), the results are much smoother while the details are well preserved.

3.5 Boundary Denoising

When each region has its own mean and covariance estimate, edges of those regions tend to become sharpened. Consequently, in one embodiment, the original smoothness of the edge is preserved after denoising by estimating the original blur between the regions of the original image. In general, this is accomplished by first locally estimating the amount of blur along each region boundary, and then smoothing the denoised image along those boundaries. This process successfully addresses the largest source of edge sharpening when applying the denoising techniques described herein.

3.5.1 Blur Width Estimation

Blur width estimation along region boundaries can be accomplished in a number of ways. For example, in one embodiment, the amount of blur is estimated by computing sub-pixel location of the region boundaries by estimating zero-crossings of Difference-of-Gaussian (DOG). A strip of some desired width of pixels is then sampled along the boundary $O_{ij}$ between adjacent regions $R_i$ and $R_j$. In a tested embodiment, a width of ±5 pixels was used. Note that the exact width of the strip is not critical, so long as there are enough pixels to estimate the blur. It is assumed that this profile image is the result of blurring a step profile image with unknown left and right colors. It is also assumed that the blur is the same for all color channels. The blur and left and right colors is then solved using the well known Levenberg-Marquardt technique.

In another embodiment, a simple search technique is used to estimate the original blur along region boundaries. In particular, in this embodiment, for each of a set of hypothesized blurs, b, from $b_{min}$ to $b_{max}$ in steps of $\delta b$, the blurred image $\mu_{blur}(x,y;b)=\mu(x,y)*G(x,y;b)$ is computed. In a tested embodiment, $b_{min}$ was set to 0, $b_{max}$ was set to 2.5, and $\delta b$ was set to 0.25. However, any desired values may be used here. An error image $I_{err}$ is then computed such that $I_{err}(x,y;b)=[\hat{I}(x, y)-\mu_{blur}(x,y;b)]^2$. Each boundary curve $O_{ij}$ is then dilated a number of times, on the order of around five or so, into regions $R_i$ and $R_j$ to obtain a mask $\Gamma_{ij}$. The best blur $b^*_{ij}$ for $O_{ij}$ corresponds to the minimum aggregate error $I_{err}(x,y;b)$ over $\Gamma_{ij}$, or $b^*_{ij} = \arg\min_b \Sigma_{(x,y)\in\Gamma_{ij}} I_{err}(x,y;b)$.

3.5.2 Blur Width Application to the Denoised Image

In either case, once the blur has been estimated, the pixels within the edge regions are blurred to match the original blurring of the original image. For example, in the case where $\mu_{blur}(x,y;b^*_{ij})$ is computed using the search process described above, the blur in the $\Gamma_{ij}$ transition region, $\mu(x,y)$ is reinstated by simply replacing $\mu(x,y)$ with $\mu_{blur}(x,y;b^*_{ij})$. Note that this assumes that the amount of blur in $R_i$ and $R_j$ is the same, which is strictly not true in general, but tends to produce good results. The per-region $\mu_i(x,y)$ estimates are then replaced with the globally smoothed $\mu(x,y)$ estimate and used in the global first-order MRF described above to obtain the final denoised image.

3.5.3 Other uses of the Estimated Blurs

One advantage of estimating the original regional boundary blurs is that the estimated boundary blurs can be used to infer the blurs associated with each individual region. In general, inferring these regional blurs as a function of the boundary blurs is accomplished by solving a combinatorial assignment problem to infer the blurs.

Knowledge of either or both the boundary and regional blurs enables a number of additional imaging effects to be applied to the denoised image. For example, in various embodiments, these blur estimates are used to reduce motion blur, simulate selective focus (by adjusting the blur estimates), and to perform super-resolution enhancement (especially at region boundaries) of the output images.

For example, once the blur function parameter (sigma of Gaussian function) has been computed at every boundary pixel between different regions, this parameter is easily modified for various effects. One such effect is to reduce all the blur parameters by constant factor. Such constant reduction has the effect of sharpening edges and super-resolving the image. In the limit, the blur can all be set to zero for a more banded or cartoon-like effect.

In another embodiment, the user is presented with a user interface that allows manual selection of one or more regions of the image. Since the image is decomposed and the various regions identified as a first step in image processing, it is a simple process to allow the user to select various regions through a simple point and click technique or by selection from a list of the various image regions. The blur associated with individual regions, or individual region boundaries can then be adjusted either up or down to provide either selective blurring or selective sharpening, respectively, of specific regions of the image.

In a related embodiment, selective focus of particular regions is accomplished in much the same manner as described above. For example, in an image captured with a large depth of field, most of the image will be in focus (little blurring in the various regions). However, using the manual region selection process described above, the user can select an area to keep in focus (such as a foreground region of the image) while artificially defocusing the background (this may be done for artistic purposes, for example). This is easily accomplished by user selection of the regions associated with background objects to increase the amount of blur for those regions. In addition, the blur of non-selected objects can either be left alone, or decreased to enhance those regions relative to the background objects. Similarly, the user can arbitrarily change the spatial distribution of the blur parameters for other types of special effects.

Further, it should be noted that in various embodiments, these blur-adjustment techniques are applied to images to create the effects described above even in the case where the images are not first denoised. In this case, the steps described above, with the exception of the denoising step, are applied to the image. Consequently, in this embodiment, the image is decomposed into regions, regional blur estimates are made, and then one or more regions of the image are modified by selective adjustment of the various blurs of the image, as described above, to create the desired imaging effects.

4.0 Image Denoiser Operation

Figure 6:
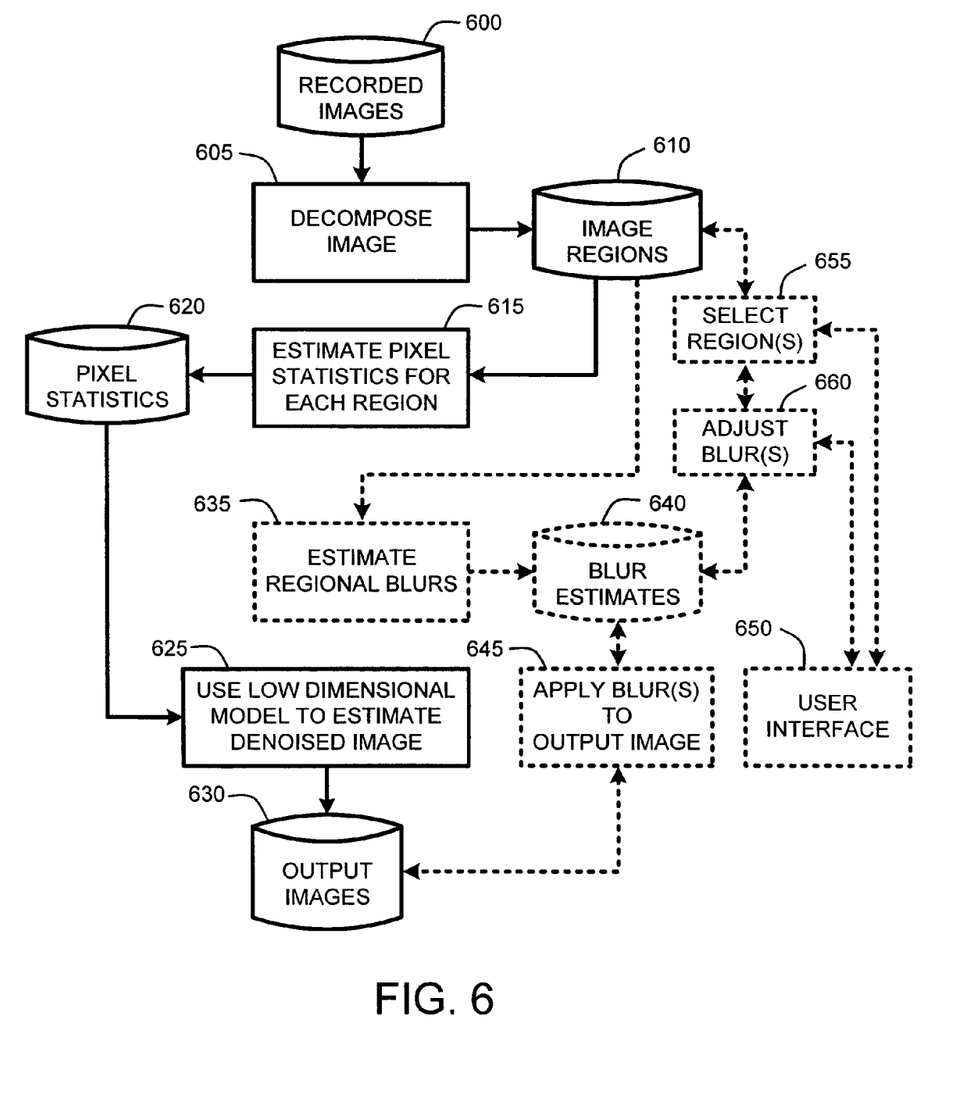
FIG. 6 illustrates an exemplary system flow diagram for denoising images.

The processes described above with respect to FIG. 4 and in view of the detailed description provided above in Section 3 are summarized by the general operational flow diagram of FIG. 6, which illustrates an exemplary operational flow diagram showing various embodiments of the Image Denoiser.

In particular, as illustrated by FIG. 6, the Image Denoiser begins operation by decomposing 605 a recorded image 600 into a plurality of image regions 610. As described above, this decomposition step 605 uses conventional techniques such as, for example, mean shift, graph-based or clustering-based image segmentation methods to decompose the image into segments represented by a mean color and spatial extent.

Each region of the image is then individually evaluated to estimate 615 regional pixel statistics 620 for each region. As described above, in one embodiment, these regional pixel statistics 620 are estimated by fitting a pixel mean value function to the presumably noisy pixels of the input image 600. A covariance matrix is then estimated for each region from the residual pixel values (i.e., the noisy pixels remaining after fitting the mean value function to each region of the input image). Together, these regional pixel statistics 620 describe the image pixels in each region.

A low dimensional probabilistic model derived from the generative model of image formation is then used to estimate 625 a denoised copy 630 of the original image 600 from the regional pixel statistics 620.

In one embodiment, the denoised output image 630 is further enhanced by applying 645 regional blur estimates 640 computed 635 from an evaluation of the image regions 610. As described above, applying the original estimated blurs 640 to the output image 630 tends to reduce any artificial sharpening of edges resulting from the region-based probabilistic estimation of the output image.

In a related embodiment, a user interface 650 is provided to allow manual user selection 655 of one or more regions of the output image 630 (or the original image 600). Note that selection 655 of such regions can be made by selecting points on either the original input image 600 or the output image 630 since the spatial extents of the regions 610 of the decomposed input image will map identically to either the original image or the output image. Once selected 655, the user can individually adjust 660 (increase or decrease) the blurs associated with particular regions or region boundaries to achieve a desired imaging effect, as described above. Note that global adjustments 660 of the blurs associated with the entire image are also enabled. The adjusted blurs 660 are then applied 645 to the output image 630 (or to the original image 600, if desired).

Figure 7:
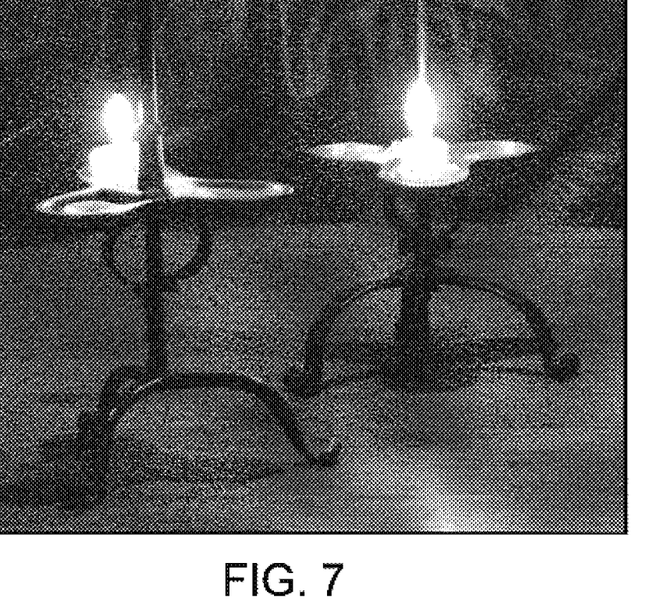
FIG. 7 illustrates a noisy image (captured in low light).
Figure 8:
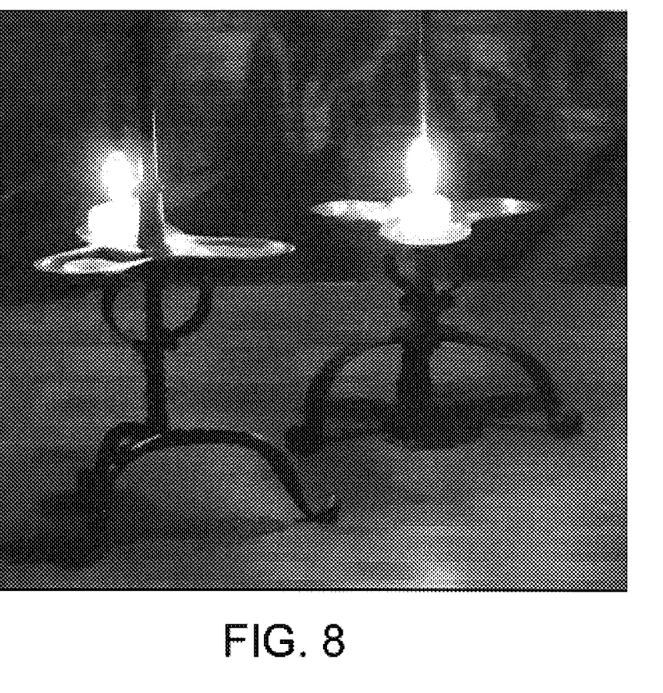
FIG. 8 illustrates a denoised copy of the noisy image of FIG. 7 following processing by the Image Denoiser, as described herein.

Finally, FIG. 7 and FIG. 8 illustrate the effects of applying the denoising techniques described herein to noisy input image to produce a denoised output image. In particular, FIG. 7 illustrates a noisy image of a burning candle captured in low light. FIG. 8 illustrates a denoised copy of the noisy image of FIG. 7 following processing by the Image Denoiser using a first-order model, as described above.

The foregoing description of the Image Denoiser has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Image Denoiser. It is intended that the scope of the invention be limited not by this detailed description, but rather by the claims appended hereto.

What is claimed is:

1. A computer implemented process for denoising an image, comprising using a computing device to perform the steps for:
    decomposing an input image into a plurality of piecewise smooth regions;
    estimating a low-dimensional statistical model for each region; and
    inferring a denoised copy of the input image as a probabilistic function of the statistical models to construct an output image.

2. The computer implemented process of claim 1 further comprising estimating a local blur at edges of each region of the input image.

3. The computer implemented process of claim 2 further comprising applying the estimated local blurs to corresponding regions of the output image.

4. The computer implemented process of claim 1 wherein estimating the low-dimensional statistical model for each region is based on pixel statistics computed for each region, said pixel statistics including an affinely varying mean pixel color and a correlated color covariance matrix for modeling residual pixel colors.

5. The computer implemented process of claim 3 further comprising steps for manually selecting one or more of the piecewise smooth regions and adjusting the blur associated with one or more of the selected regions.

6. The computer implemented process of claim 1 wherein the low-dimensional statistical model is a $0^{th}$-order model which denoises the input image by maximizing an a posteriori likelihood of a clean pixel residual for each region which is then added to mean pixel estimates of each region.

7. The computer implemented process of claim 1 wherein the low-dimensional statistical model is a first-order model which denoises the input image by minimizing an energy of a first-order MRF which models pixel deviation from modeled pixel mean values for each region.

8. A digital camera for automatically denoising captured images, comprising:
    a device for capturing and storing an input image;
    a device for evaluating the stored input image and decomposing the input image into a plurality of discrete regions, each region being defined by estimated pixel color statistics and pixel spatial statistics;
    a device for estimating blur amounts of each region;
    a device for estimating a low-dimensional statistical model for each region as a function of the estimated pixel color statistics and pixel spatial statistics;
    a device for inferring a denoised copy of the input image as a probabilistic function of the low-dimensional statistical models; and
    a device for applying the estimated blur amounts to corresponding regions of the denoised copy of the input image.

9. The digital camera of claim 8 wherein the blur amounts of each region are estimated by evaluating samples of pixels within a strip of pixels having a predefined width overlapping the edges of adjacent regions, and using the sampled pixels to estimate an optimal blur amount for modeling each strip of pixels.

10. The digital camera of claim 8 wherein the blur amounts of each region are estimated by minimizing a computed error with respect to a series of hypothetical blurs along the boundaries of adjacent regions.

11. The digital camera of claim 8 further comprising a user interface device for:
    manually selecting one or more of the regions; and
    manually adjusting the estimated blur amounts associated with one or more of the selected regions prior to applying the estimated blur amounts to corresponding regions of the denoised copy of the input image.

12. The digital camera of claim 8 wherein the low-dimensional statistical model is a $0^{th}$-order Bayesian probabilistic generative model of image formation.

13. The digital camera of claim 8 wherein the low-dimensional statistical model is a first-order Bayesian probabilistic generative model of image formation.

14. The digital camera of claim 8 wherein the pixel color statistics for defining each region are estimated by assuming a linearly varying mean pixel color for each region and estimating a correlated color covariance matrix of any remaining residual pixels for each region.

15. A computer readable storage media having computer executable instructions stored thereon for automatically denoising an image, said computer executable instructions comprising:
    decomposing an input image into a plurality of discrete regions, each region being defined by estimated pixel color statistics and pixel spatial statistics;
    estimating a low-dimensional statistical model for each region as a function of the estimated pixel color statistics and pixel spatial statistics; and
    inferring a denoised copy of the input image as a probabilistic function of the low-dimensional statistical models.

16. The computer-readable storage media of claim 15 further comprising estimating blur amounts corresponding to each discrete region by examining pixel characteristics of adjacent regions.

17. The computer-readable storage media of claim 16 further comprising applying the estimated blur amounts to corresponding regions of the denoised copy of the input image.

18. The computer-readable storage media of claim 16 further comprising a user interface for adjusting one or more user selectable blur amounts corresponding to the discrete regions.

19. The computer-readable storage media of claim 15 wherein decomposing the image into a plurality of discrete regions comprises identifying a set of approximately piecewise smooth regions that collectively represent the entire image.

20. The computer-readable storage media of claim 15 wherein estimating the pixel color statistics comprises assuming a linearly varying mean pixel color for each region and estimating a correlated color covariance matrix of any remaining residual pixels for each region relative to the input image.

* * * * *